(12) United States Patent
Rauter et al.

(10) Patent No.: US 8,161,836 B2
(45) Date of Patent: Apr. 24, 2012

(54) MULTI-STEP TRANSMISSION

(75) Inventors: Jürgen Rauter, Friedrichshafen (DE); Martin Lamke, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 327 days.

(21) Appl. No.: 12/408,922

(22) Filed: Mar. 23, 2009

(65) Prior Publication Data
US 2009/0241707 A1   Oct. 1, 2009

(30) Foreign Application Priority Data

Mar. 26, 2008   (DE) .......................... 10 2008 000 821

(51) Int. Cl.
*F16H 3/08*   (2006.01)

(52) U.S. Cl. ........................................ 74/331

(58) Field of Classification Search ............... 74/325, 74/329, 331
See application file for complete search history.

(56) References Cited

U.S. PATENT DOCUMENTS

| 4,226,135 A | * | 10/1980 | Winter | 74/330 |
| 4,388,838 A | * | 6/1983 | Richards et al. | 74/331 |
| 4,640,145 A | * | 2/1987 | Vandervoort | 74/325 |
| 5,647,246 A | | 7/1997 | Craft et al. | |
| 5,735,175 A | * | 4/1998 | Forsyth | 74/331 |
| 5,743,141 A | * | 4/1998 | Forsyth | 74/331 |
| 7,334,493 B2 | | 2/2008 | Renner | |
| 2006/0112778 A1 | | 6/2006 | Renner | |

FOREIGN PATENT DOCUMENTS

| DE | 10 2004 057 126 A1 | 6/2006 |
| EP | 0075408 | 3/1983 |

\* cited by examiner

*Primary Examiner* — David D Le
*Assistant Examiner* — Michael Gonzalez
(74) *Attorney, Agent, or Firm* — Davis & Bujold, P.L.L.C.

(57) ABSTRACT

A multi-step transmission having at least a reverse drive gear, several forward drive gears, a main shaft (1) and two counter shafts. The power flow in forward drive can be split up and be distributed to both counter shafts and further transferred to the main shaft (1). The forward drive gears each include two counter shaft gears and one idle gear which is supported on the main shaft (1). In contrast, only one of the two counter shafts (2) is assigned and associated with a reverse gear (3) such that the flow of power, in a reverse drive gear (3), is transferred through a single counter shaft (2).

6 Claims, 2 Drawing Sheets

MULTI-STEP TRANSMISSION

This application claims priority from German patent application serial no. 10 2008 000 821.4 filed Mar. 26, 2008.

FIELD OF THE INVENTION

The invention relates to a multi-step transmission with at least one reverse gear, several forward gear steps, and two counter shafts.

BACKGROUND OF THE INVENTION

Known in the art and technology are multi-step transmission with two counter shafts and a central main shaft. The gearwheels, which are mounted loosely on the rotating main shaft, follow the same rotation direction and only engage the main shaft when the particular gear is needed to deliver and to transmit the torque. Therefore, the gear wheels are also called idle gears.

Idle gears are connected to the floating main shaft, having a certain amount of play regarding the radial direction. Hereby, load compensation of the energy flow is achieved between the two lay-shafts. The idle gears, which mesh with the counter shaft wheel's gearing are guided in the radial direction by the counter shaft gears, i.e., each idle gear mounted on the main shaft and having a radial play, will center itself under the gearing force of the counter shaft gear wheels. That condition occurs when the corresponding shift step is selected, the clutch being engaged, and the motor works in the push or the pull position. Thus, an optimum in regard to load compensation during the torque transfer can be achieved. The idle gears, currently not being assigned to any gear shift steps, are idling in a load free condition. In that load free condition, the idle gears are floating within the gearing's play, meaning that they possess, in relationship to the main shaft, the leeway of moving within a radial direction and a circumferential direction.

Because of the idle gear's versatile bearing, an unpleasant rattling noise occurs during operation, due to the fact that the gears, which are part of the no-load gear shift condition, experience accelerations in the circumferential and radial directions, caused by tolerances in manufacturing and by rotation oscillation during a push or pull condition when activating or deactivating the power train. Due to the mentioned acceleration and their motion, the idle gears strike the components and parts right next to them. As an example, one gear's flank strikes the flank of the gear which it is supposed to work with, due to tolerances and play, a main reason why the rattling noise of gears under the no-load shift position is being generated. During the shift position in reverse, additional noise, on top of the lay-shaft gears and idle gears, is being generated through the intermediate gears.

Suggestions and proposals have already been presented to reduce the rattling noise in multi-step transmissions with two counter shafts. As an example and representation of the art, DE 102004057126 A1, presents an arrangement to reduce the idle gear's axial movement in a transmission having two counter shafts, whereby the main shaft's engagement device presses at least one of the idle gears against a run-up disk. Thereby, but not limited to it, the unwanted rattling noise can be avoided. The described engagement device requires an additional effort during the manufacturing of the transmission, and is exposed during operation to friction between the engagement device and idle gear, resulting in additional wear.

SUMMARY OF THE INVENTION

This invention's task is to define a multi-step transmission of a simple construction, requiring little maintenance, and operates smoothly at the lowest possible noise level.

The multi-stage transmission 23 therefore presents at least one reverse gear 3 and several forward gears 24, 24' and includes one main shaft 1 and two counter shafts 2, 2'. As represented in the FIG. 2 with a single solid line the energy flow 26, in forward drive, can be split between both counter shafts and is then transferred through gear steps from the counter shafts 2, 2' to the main shaft 1. Hereby, the forward gears 24, 24' include in each case two counter shaft gears 28, 28' and one idle gear 30, 30' positioned on the main shaft 1.

The counter shaft's gears, as known in the art, are rigidly coupled to the corresponding counter shaft, whereas the idle gear is attached to the main shaft in a way that it becomes attached, when shifting gears, in a torque proven way with the main shaft, while turning independently from the main shaft when that particular gear is not engaged.

The counter shaft's gears are, as known in the art and technology, rigidly connected to the corresponding counter shaft, but the idle gear is mounted on the main shaft to ensure a rigid connection with the main shaft when shifting gears, but also turning independently from the main shaft when the gear is not engaged.

In this invention, only one reverse gear 3 is being assigned to one of the counter shafts 2, so that the flow of energy 32, represented in the figures as a solid double line, in the reverse drive gear only takes place through one counter shaft 2, i.e., the reverse drive gear 3 consist only of one counter shaft gear 12, an intermediate gear 9, and one idle gear 4.

Due to the fact that the energy flow 32 of input power, as represented in FIG. 1 with arrow 35, in the reverse drive gear of this invention is just channeled through one counter shaft 2, the previously mentioned necessity of load compensation is no longer needed, therefore neither the radial play, as previously being necessary for the idle gear 4 in the reverse drive gear 3. The idle gear 4 associated with the reverse drive gear 3 can be mounted almost without any play in the radial direction, meaning that there is only a minimal amount of radial play in existence for the rotation of the main shaft gear. A larger radial play, as provided for the idle gears 30, 30' in the forward drive gears 24, 24', to achieve load compensation between the two counter shafts 2, 2', is no longer necessary for the reverse drive position. Therefore, another cause for the annoying rattling noise can be eliminated.

The lower manufacturing cost of such a transmission, compared to a conventional transmission with two counter shaft gears and two intermediate gears in the reverse drive position, represent the first advantage of this invention, due to the reduction in the number of parts used.

The reduction of the rattling noise and sound is an additional advantage, caused by a reduced number of parts having intended play in their specification. Through the intermediate gears, used for reversing the rotation's direction, additional parts are inevitably present which contribute to noise generation. According to this invention, just one intermediate gear is required, instead of the two intermediate gears in commonly known multi-step transmission, having the energy flow distribution to two counter shafts also in the reverse drive position.

In addition and surprisingly, the invention has accomplished reduction of noise in all possible gear shift positions. The rattling noise in all gear shift positions can be explained as being caused mainly from vibrations during the reverse gear drive position. This invention reduces the required gears and parts in the reverse gear shift position, at the same time also reduces the rattling noise of the entire multi-step transmission, because the forward drive shift positions are less affected by the reverse drive shift position and therefore tend to rattle much less. Therefore, a simplified construction effort results in lesser, annoying rattling noise of the entire transmission.

The advantage of the steps taken in reducing the rattling noise in the reverse drive shift position is also significant in view of commonly known gear boxes and transmissions, where usually, when operating in the forward gear position, the reverse gears are idling under a no load condition and therefore generate the rattling noise.

Just to reduce the rattling noise through the measures taken in regard to the reverse drive shift position alone is already of great advantage, because a vehicle's transmission and gear system operates more frequently in the forward drive shift position, whereas the gears in the reverse position idle at a no load condition and, in the case of a commonly known transmission system, generate the rattling noise. These operating conditions and the timing phases, more frequent forward gear use compared to the use of the reverse gear, make the advantages of the invention obvious.

In accordance with the invention's specification, the reverse drive position's idle gear is mounted on a fixed part of the multi-stage transmission's housing in a way that it can rotate. Therefore, the reverse drive gear part can be embedded in an especially low-vibration position, independently from the position of the floating main shaft. Attaching the reverse drive main shaft gear with the fixed housing part improves the transmission's oscillation behavior and the rattling noise will be further minimized. The preferred mounting hereby is by use of a ball bearing, cylinder or cone bearing, or a needle bearing.

By eliminating the energy distribution to two counter shafts while in the reverse drive position, the amount of transmitted torque in the reverse drive position is limited by the energy load handling ability of just a single reverse drive stage. The limitation can at least partially be compensated for by widening the reverse drive's gearing in accordance with a further preferred embodiment of this invention.

A further meaning of the invention, in regard to the counter shaft's gearing, also covers the manufacturing of the gearing as being directly part of the counter shaft. This invention is applicable in manual shift transmissions as well as in automatic multi-step transmissions.

BRIEF DESCRIPTION OF THE DRAWINGS

An example of this invention is being presented in FIG. 1 and FIG. 2 and is being described as follows.

DETAILED DESCRIPTION OF THE PREFERRED EMBODIMENTS

Figure 1:
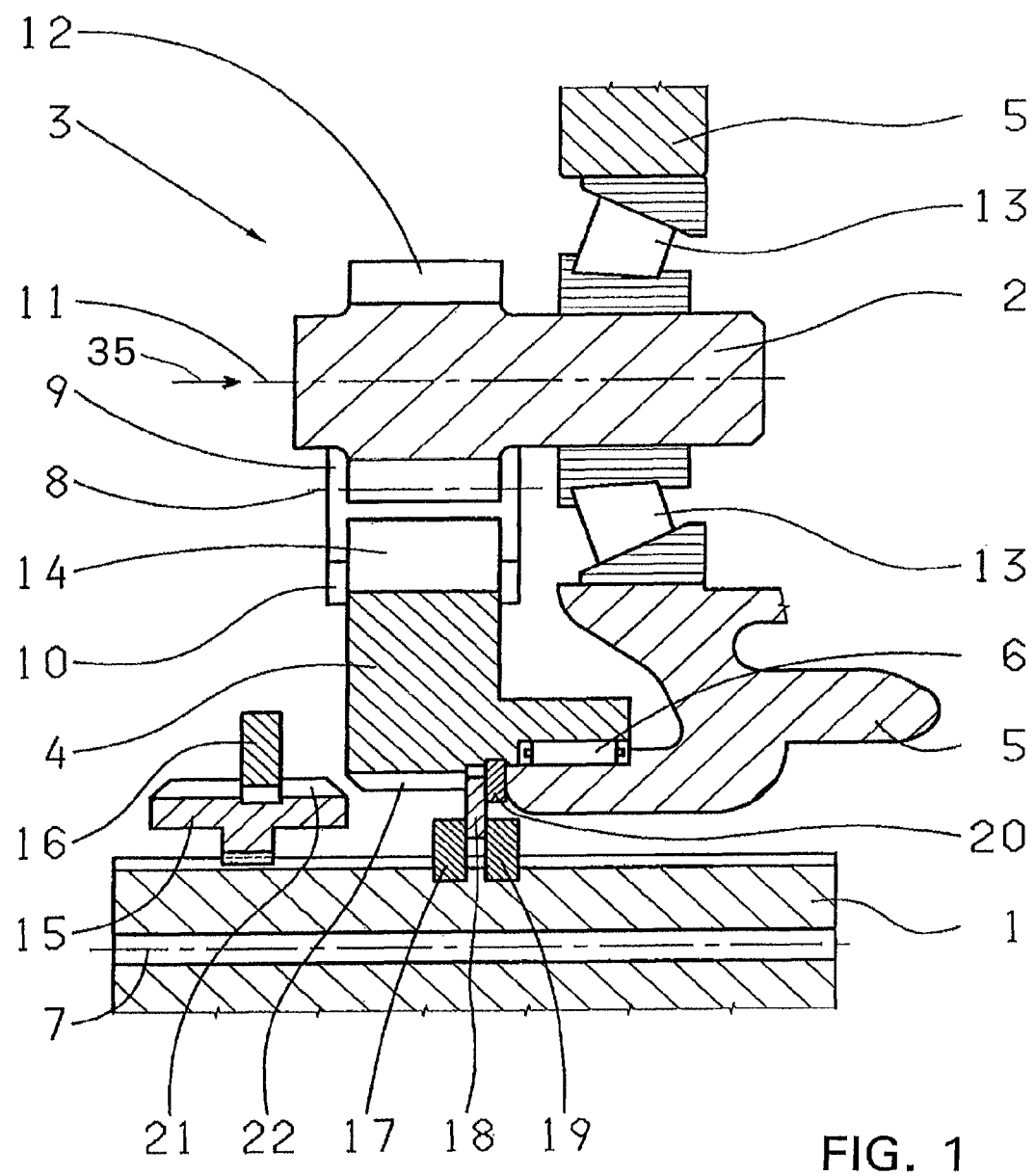
FIG. 1 represents a partial cross-sectional view of the invention's multi-step transmission, including the reverse drive gear part.
Figure 2:
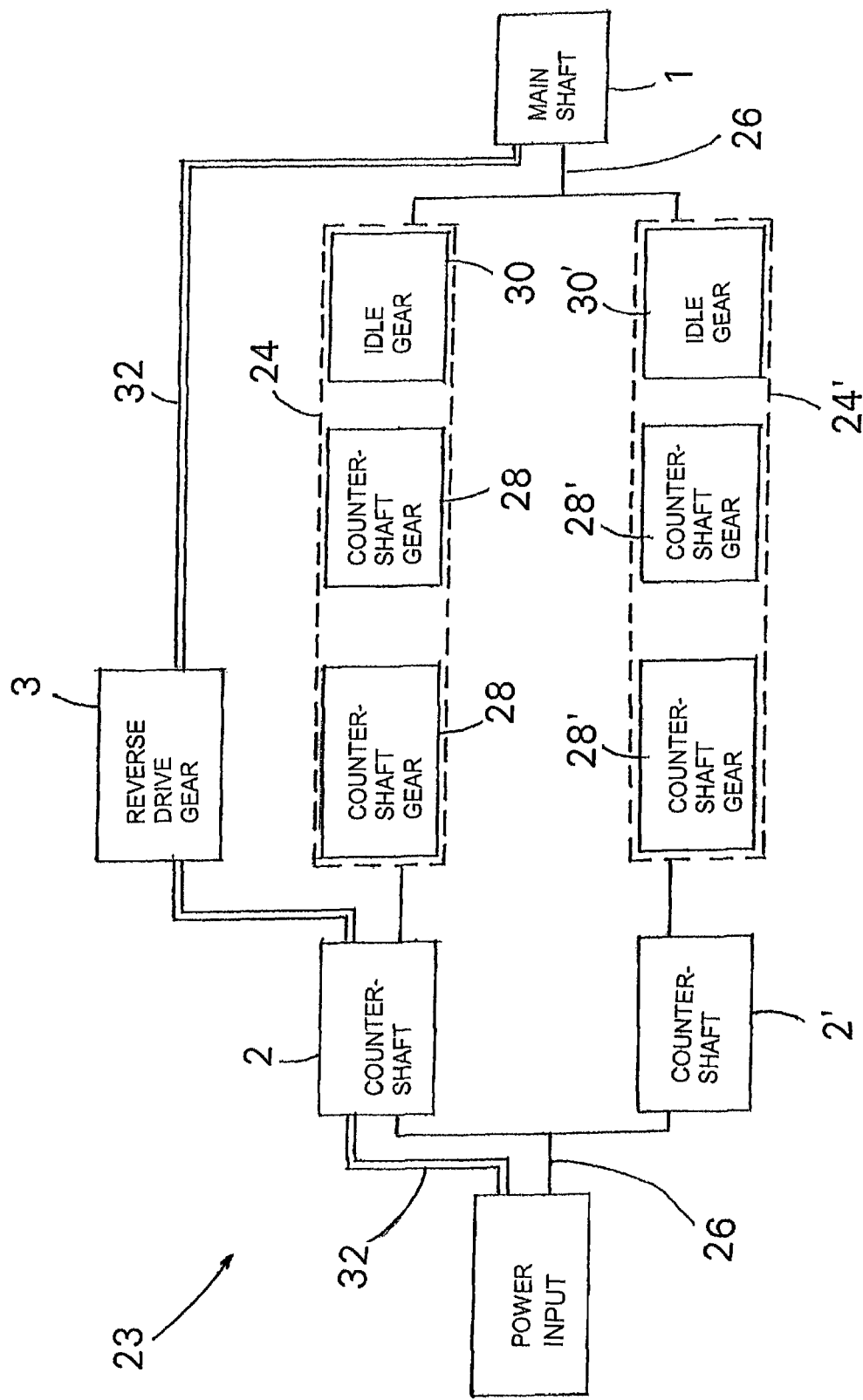
FIG. 2 is a schematic view of the multi-step transmission according to the invention.

The main shaft (1) is being presented in FIG. 1 and is a detailed view of an area in the reverse drive position gear (3) in the multi-step transmission shown in FIG. 2. The bearings of the main shaft (1) which reside outside of the area are not shown in the drawing. The main shaft (1) floats, meaning that it is supported in a manner to have radial play.

An idle gear (4) of the reverse drive gear (3) is mounted to rotate around the central axis (7) of the main shaft (1). The idle gear (4) is being mounted in the transmission housing (5) by means of a needle bearing (6). Adequate guidance for the idle gear (4), in the axial direction, is achieved though the spacer disks (17), (19), and (20), as well as through the ring disk (18) supported on the main shaft (1).

To enable the reverse drive gear (3), a sliding shift collar (15), which is present on the main shaft (1), will be shifted in an axial direction by the shift element (16). Hereby, the outer gearing (21) of the sliding shift collar (15) is engaged with the idle gear's (4) inner gearing (22), whereby the idle gear (4) becomes rotationally fixed with the main shaft (1).

The idle gear (4), through an intermediate gear (9), is constantly engaged with the counter shaft gear (12), which is rigidly joined with counter shaft (2) or which is built as single-section. To enhance the presentation in FIG. 1, the intermediate gear (9), rotating around the central axis (8), is shown in FIG. 1 with the gearing (10) being wider than the counter shaft gear (12), the gearing (14) of the idle gear (4). The intermediate gear (9) achieves the necessary reverse rotation, important for the reverse drive gear position.

The counter shaft (2) rotates around its central axis (11) and is supported by a cone bearing (13). A second counter shaft, in relationship to the main shaft (1), is mounted opposite to counter shaft (2). FIG. 2 schematically shows that the second counter shaft is not assigned to a reverse drive operation.

DRAWING NUMBERING REFERENCES

1 Main Shaft
2 Counter Shaft
3 Reverse Drive Position
4 Idle Gear
5 Transmission Housing
6 Needle Bearing
7 Central Axis
8 Central Axis
9 Intermediate Gear
10 Gearing
11 Central Axis
12 Counter Shaft Gear
13 Cone Bearing
14 Gearing
15 Shift Collar
16 Shift Element
17 Spacer Disk
18 Ring Disk
19 Spacer Disk
20 Spacer Disk
21 Outer Gearing
22 Inner Gearing

The invention claimed is:

1. A multi-step transmission comprising one reverse drive gear (3) and several forward drive gears (24, 24'), a main shaft (1) and two counter shafts (2, 2'), a flow of power (26) from a power input, while the multi-step transmission is in one of the forward drive gears, is distributed to both of the two counter shafts and then transferred, through the forward drive gear, to the main shaft (1), each of the forward drive gears (24, 24') comprises two counter shaft gears (28, 28') and an idle gear (30, 30') that is mounted on the main shaft (1), a single one of the two counter shafts (2) is associated with the reverse drive gear (3), such that a flow of power (32) in the reverse drive gear (3) is only transferred to the main shaft via the single one of the two counter shafts (2).

2. The multi-step transmission according to claim 1, wherein the reverse drive gear (3) comprises at least only one counter shaft gear (12) and only one intermediate gear (9).

3. The multi-step transmission according to claim 1, wherein an idle gear (4), of the reverse drive gear (3), is supported on a fixed portion of a housing (5) of the multi-step transmission (23) and is rotatable.

4. The multi-step transmission according to claim 1, wherein an idle gear (4) of the reverse drive gear (3) rotates on a needle bearing (6) about a central axis (7) of the main shaft (1).

5. A multi-step transmission having one reverse drive gear (3) and a plurality of forward drive gears (24, 24'), the transmission comprising:

first and second counter shafts (2, 2') and a main shaft (1) which rotates about a main shaft rotational axis (7);

each of the plurality of forward drive gears (24, 24') comprising a gear (28, 28') that is supported on a respective one of the first and the second counter shafts (2, 2') and an idle gear (30) that is supported by the main shaft (3) such that, in the forward drive gears (24, 24'), power flows from a power input at least though each of the first and the second counter shafts (2, 2') and the gears (28, 28') supported thereon, via the respective idle gear (30, 30'), to the main shaft (1);

the reverse drive gear (3) comprising a single one of the first and the second counter shafts (2), a reverse counter shaft gear (12), a reverse intermediate gear (9), a reverse idle gear (4) and a shift collar (15), which is rotationally fixed to the main shaft (1), such that a power flow (32), in the reverse drive gear (3), flows from the power input at least though only a single one of the first and the second counter shafts (2) to the main shaft (1); and the reverse idle gear (4) is radially supported by a bearing (6) on a transmission housing (5) and rotates about the main shaft rotational axis (7), the reverse idle gear (4) having gearing (22) and a third spacer disk (20) that is axially fixed thereto and the main shaft having first and second spacer disks (17, 19) that are axially fixed thereto, a ring disk (18) being axially fixed between the first and the second spacer disks (17, 19) of the main shaft (1) and between the gearing (22) of the reverse idle gear (4) and the third spacer disk (20) so as to axially fix the reverse idle gear (4).

6. A multi-step transmission comprising one reverse drive gear (3) and several forward drive gears (24, 24'), a main shaft (1) and two counter shafts (2, 2'), a flow of power (26) from a power input, while the multi-step transmission is in one of the forward drive gears, is distributed to both of the two counter shafts and then transferred, through the forward drive gear, to the main shaft (1), each of the forward drive gears (24, 24') comprises two counter shaft gears (28, 28') and an idle gear (30, 30') that is mounted on the main shaft (1), a single one of the two counter shafts (2) is associated with the reverse drive gear (3), such that a flow of power (32) in the reverse drive gear (3) is only transferred to the main shaft via the single one of the two counter shafts (2).

\* \* \* \* \*